United States Patent
Zahavi et al.

(10) Patent No.: US 6,577,859 B1
(45) Date of Patent: Jun. 10, 2003

(54) CELLULAR PHONE SYSTEM WITH OUTGOING MESSAGE SELECTION SYSTEM

(76) Inventors: Gadi Zahavi, 326 E. 85th St. #3A, New York, NY (US) 10028; Eitan Zahavi, Boraros Ter Dunahaz 7/2, 111/3, 1095 Budapest (HU)

( * ) Notice: Subject to any disclaimer, the term of this patent is extended or adjusted under 35 U.S.C. 154(b) by 0 days.

(21) Appl. No.: 09/327,028

(22) Filed: Jun. 7, 1999

(51) Int. Cl.$^7$ .............................................. H04M 11/10
(52) U.S. Cl. ....................... 455/412; 455/414; 455/517; 379/201.01
(58) Field of Search ................................. 455/412, 413, 455/517, 575, 414; 379/67.1, 201.01; 709/217–219

(56) References Cited

U.S. PATENT DOCUMENTS

| | | | |
|---|---|---|---|
| 4,563,758 A | 1/1986 | Paternostro | 367/132 |
| 4,734,930 A * | 3/1988 | Quiros et al. | 379/67.1 |
| 4,785,420 A | 11/1988 | Little | 364/513 |
| 4,850,005 A | 7/1989 | Hashimoto | 379/51 |
| 4,893,329 A | 1/1990 | O'Brien | 379/88 |
| 5,031,205 A | 7/1991 | Phillips | 379/88 |
| 5,189,692 A | 2/1993 | Ferrara | 379/88 |
| 5,434,906 A | 7/1995 | Robinson et al. | 379/67 |
| 5,444,767 A | 8/1995 | Goetcheus et al. | 379/67 |
| 5,533,104 A | 7/1996 | Weiss | 379/70 |
| 5,544,230 A | 8/1996 | Megyesi | 379/67 |
| 5,548,636 A * | 8/1996 | Bannister et al. | 455/413 |
| 5,561,712 A | 10/1996 | Nishihara | 379/355 |
| 5,581,604 A * | 12/1996 | Robinson et al. | 379/67.1 |
| 5,651,053 A | 7/1997 | Mitchell | 379/67 |
| 5,717,739 A | 2/1998 | Dyer et al. | 379/67 |
| 5,748,709 A * | 5/1998 | Sheerin | 370/67.1 |
| 5,822,402 A | 10/1998 | Marszalek | 379/67 |
| 5,822,416 A | 10/1998 | Goodacre | 379/142 |

FOREIGN PATENT DOCUMENTS

| | | | |
|---|---|---|---|
| EP | 0851647 | * 12/1997 | H04M/11/10 |
| EP | 851647 A | 7/1998 | |

* cited by examiner

Primary Examiner—William Trost
Assistant Examiner—Simon Nguyen
(74) Attorney, Agent, or Firm—Sofer & Haroun, LLP

(57) ABSTRACT

A system and method which allows a cellular phone user to communicate with a caller when the user is unable to speak aloud. The method comprises the steps of establishing a wireless communication link between a wireless terminal user and a second party and selectively activating at the wireless terminal the transmission of at least one audible message for receipt by the second party, wherein the audible message is responsive to a message transmitted by the second party. The audible message may be selected by the wireless terminal user from a plurality of audible messages, such as a personalized message pre-recorded by the wireless terminal user. According to other embodiments of the invention, the wireless communication link may be initiated by either the second party or by the wireless terminal user. Preferably, the activating step further comprises activating a terminal function key, such as by pressing a key on the wireless terminal's keypad or by selecting a menu item from a display screen of the wireless terminal, corresponding to the transmitted message. In one embodiment, the terminal is configured to have two such keys or menu items positioned on the wireless terminal so as to be selected by the wireless terminal user without removing the terminal from the user's ear.

30 Claims, 4 Drawing Sheets

CELLULAR PHONE SYSTEM WITH OUTGOING MESSAGE SELECTION SYSTEM

FIELD OF THE INVENTION

This invention relates generally to cellular phone systems, and more particularly to a system that employs an outgoing message selection system.

BACKGROUND OF THE INVENTION

Due to the rapid advances that have been made in wireless communication technology, and the resulting increased affordability of this technology, the use of cellular phones has increased dramatically in recent years. Because cellular service is so affordable, more and more people rely on their cellular phones to remain in touch with their jobs, customers, family, friends, etc at all times of the day. Thus, it is very common for a cellular phone user to carry their cellular phone with them at all times, so as to be reached whenever and wherever they may be.

However, while it may be desirable to carry a cellular phone at all times, there are many situations when it is inappropriate to carry on a conversation. For instance, when a person attends a Broadway show or works in a library, it is inappropriate to speak to a caller, since people in these settings are expected to remain silent. Similarly, when a lawyer is in court, it would be disruptive to the proceeding if she were to speak to a caller on her cellular phone. Likewise for a participant in a conference or meeting.

Just as there are situations when it is inappropriate to hold a conversation on a cellular phone, there are also situations when it is imperative not to do so. For instance, in a military setting, "radio silence" may be required to be maintained in order to insure the safety of a soldier, or to prevent the interception of radio transmissions by others.

Previously, a cellular phone user had several options to prevent the potentially embarrassing (or dangerous) need to answer a cellular phone call which arrives at a time when the cellular phone user can not appropriately carry on a conversation. The first option is to turn the cellular phone off. Of course, by doing this, the cellular phone user is no longer in touch with the people that need to reach her.

In order to eliminate the need to shut off the phone, some cellular phone service providers have messaging services in which, if a cellular phone is turned off when a call is transmitted, the caller can leave a message. The service provider then informs the cellular phone user when she next turns the cell phone back on that a message has been left for her while her phone was off. Unfortunately, although the cellular phone user eventually receives the message, the call may have been an emergency and the message may be delivered undesirably late.

Another option is to set the cellular phone to a silent ring mode. In this case, instead of ringing, the phone vibrates or lights up when an incoming call is received. However, even though the cell phone user is aware that a call is incoming, the user can not answer the call without speaking and interrupting the activity around her.

In order to prevent the disruption caused by cellular phone calls, some facilities, such as concert halls, have transmission jamming systems that prevent calls from being made or received to a cellular phone located within the facility. Unfortunately, these systems are controversial in that all incoming and outgoing calls are jammed, regardless of the content of the calls. In addition to first amendment "free speech" problems raised by this practice, there are also liability issues, such as if the system prevents the making or receiving of emergency phone calls from or to a person in the facility.

Several patents exist which address the problem of communicating when a one of the communicating parties is unable to speak. For instance, one prior art patent is U.S. Pat. No. 5,548,636 to Bannister (hereinafter "Bannister"), which discloses a method and apparatus for providing user-controlled call management services. Specifically, Bannister discloses a call-on-hold feature. According to this feature, when an incoming call is received at a subscriber's terminal, the subscriber puts the call on hold by pressing a terminal function key. A message is then offered to the calling party such as "please wait and your call will be answered shortly". Once the subscriber has moved to a more suitable location to answer the call, the subscriber can then connect to the incoming call by pressing another terminal function key. Unfortunately, the feature disclosed by this patent requires the subscriber to move to another location, which, in addition to being an inconvenience to the subscriber, may also be disruptive to others in the vicinity.

Another patent that relates to this problem is U.S. Pat. No. 4,785,420 to Little (hereinafter "Little"), which discloses an audio/telephone communication system for people who are verbally handicapped. The system discloses a matrix of touch-sensitive contacts carrying an overlay of symbols representing spoken messages. During the course of a telephone call, a verbally handicapped person communicates by pressing the touch-sensitive contact corresponding to the message desired to be transmitted to the other party. Unfortunately, the features disclosed by this patent requires the user to have a touch sensitive matrix and a computer specifically configured and adapted for the task. In addition, the verbally handicapped person is limited to the responses represented by symbols, whereby a message that does not have a corresponding symbol can not be transmitted.

Therefore, a need exists for a system and method which allows a cellular phone user to communicate with a caller when the user is unable to speak aloud.

SUMMARY OF THE INVENTION

In accordance with one embodiment, the present invention relates to a system and method which allows a cellular phone user to communicate with a caller when the user is unable to speak aloud. The method comprising the steps of establishing a wireless communication link between a wireless terminal user and a second party and selectively activating at the wireless terminal the transmission of at least one audible message for receipt by the second party, wherein the audible message is responsive to a message transmitted by the second party. The audible message may be selected by the wireless terminal user from a plurality of audible messages, such as a personalized message pre-recorded by the wireless terminal user. According to other embodiments of the invention, the wireless communication link may be initiated by either the second party or by the wireless terminal user.

Preferably, the activating step further comprises activating a terminal function key, such as by pressing a key on the wireless terminal's keypad or by selecting a menu item from a display screen of the wireless terminal, corresponding to the transmitted message. In one embodiment, the terminal is configured to have two such keys or menu items positioned on the wireless terminal so as to be selected by the wireless terminal user without removing the terminal from the user's ear.

BRIEF DESCRIPTION OF THE DRAWINGS

The present invention will be further understood from the following description with reference to the accompanying drawings, in which.

DETAILED DESCRIPTION OF THE INVENTION

The present invention, in accordance with one embodiment, relates to a system and method which allows the user of a wireless terminal, such as a cellular telephone, to communicate with a caller when the user is unable to speak aloud.

Figure 1:
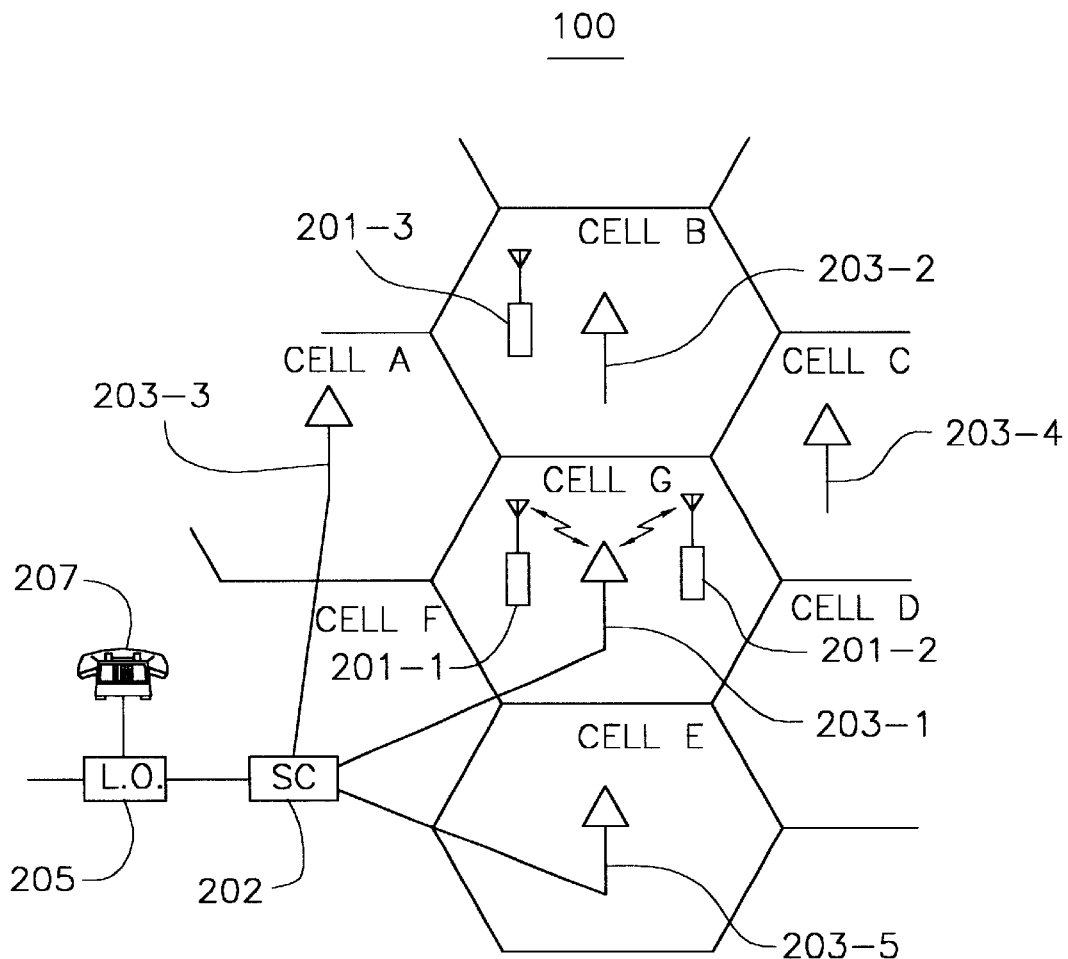
FIG. 1 illustrates a typical wireless telecommunications system, as found in the prior art.

FIG. 1 illustrates a typical wireless telecommunications system. Switching center 202 is connected to a plurality of base stations, such as those depicted by base stations 203-1 through 203-5. Additionally, switching center 202 is connected to local or long-distance telephone offices (not shown). Wireless terminals, such as those depicted by terminals 201-1 through 201-3, communicate with a base station which is located in the same pre-determined geographic area, or cell, as itself. For instance, since wireless terminals 201-1 and 201-2 are located in cell G, they therefore communicate with base station 203-1, which is located in and services cell G.

In order for wireless terminal 201-1 to communicate, it sends a signal via radio waves to base station 203-1; base station 203-1 relays the received signal to switching center 202; and, switching center 202, according to instructions supplied as part of the signal, relays the signal elsewhere. If the desired destination of the signal is another wireless terminal, then switching center 202 relays the signal to a base station located in the same cell as the wireless terminal intended to receive the signal, and the base station transmits the signal via radio waves to the wireless terminal. Likewise, if the desired destination of the signal is a wireline terminal, such as wireline terminal 207, then switching center 202 relays the signal to the desired destination via wirelines to the local or long-distance networks.

Figure 2:
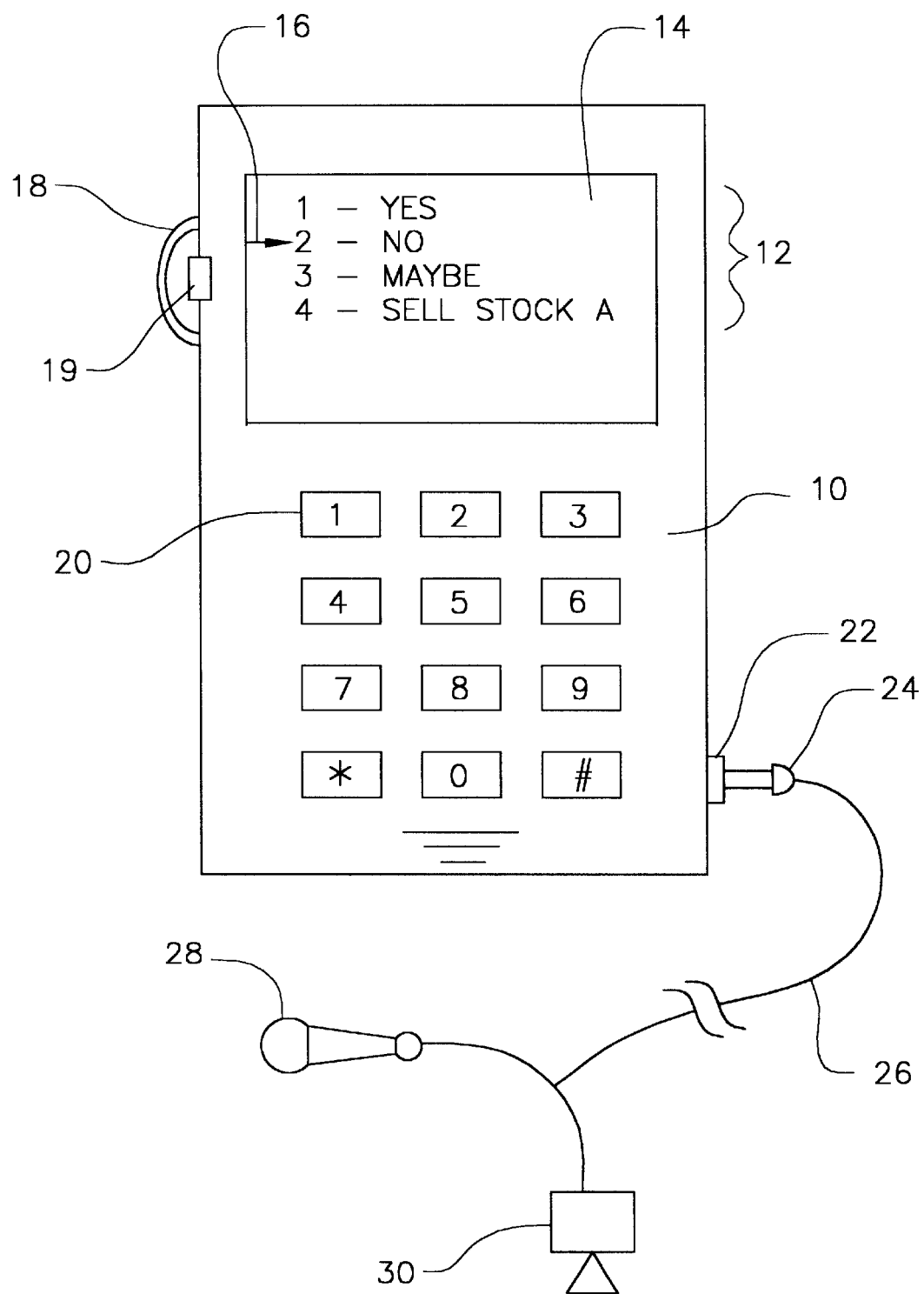
FIG. 2 illustrates the features of a wireless terminal employed by one embodiment of the present invention.

FIG. 2 illustrates the features of a wireless terminal such as a cellular telephone which is typical in the prior art, and which is employed in one embodiment of the present invention. Terminal 10 comprises a plurality of buttons 20 which may be pressed by the user. In addition, terminal 10 comprises a display screen 14, which displays menu 12. Menu 12 consists of various menu items which the user can select as desired. The selection of a menu item from menu 12 is accomplished by positioning pointer 16 at the desired menu item via pointer adjustment means 18 and activating selection means 19. In the terminal shown in FIG. 2, pointer adjustment means 18 is a roller mechanism, while selection means 19 is a contact switch which is activated when the surface of roller mechanism is pressed by the user. Additional features, along with the method by which these features are employed, are further discussed below.

Figure 3:
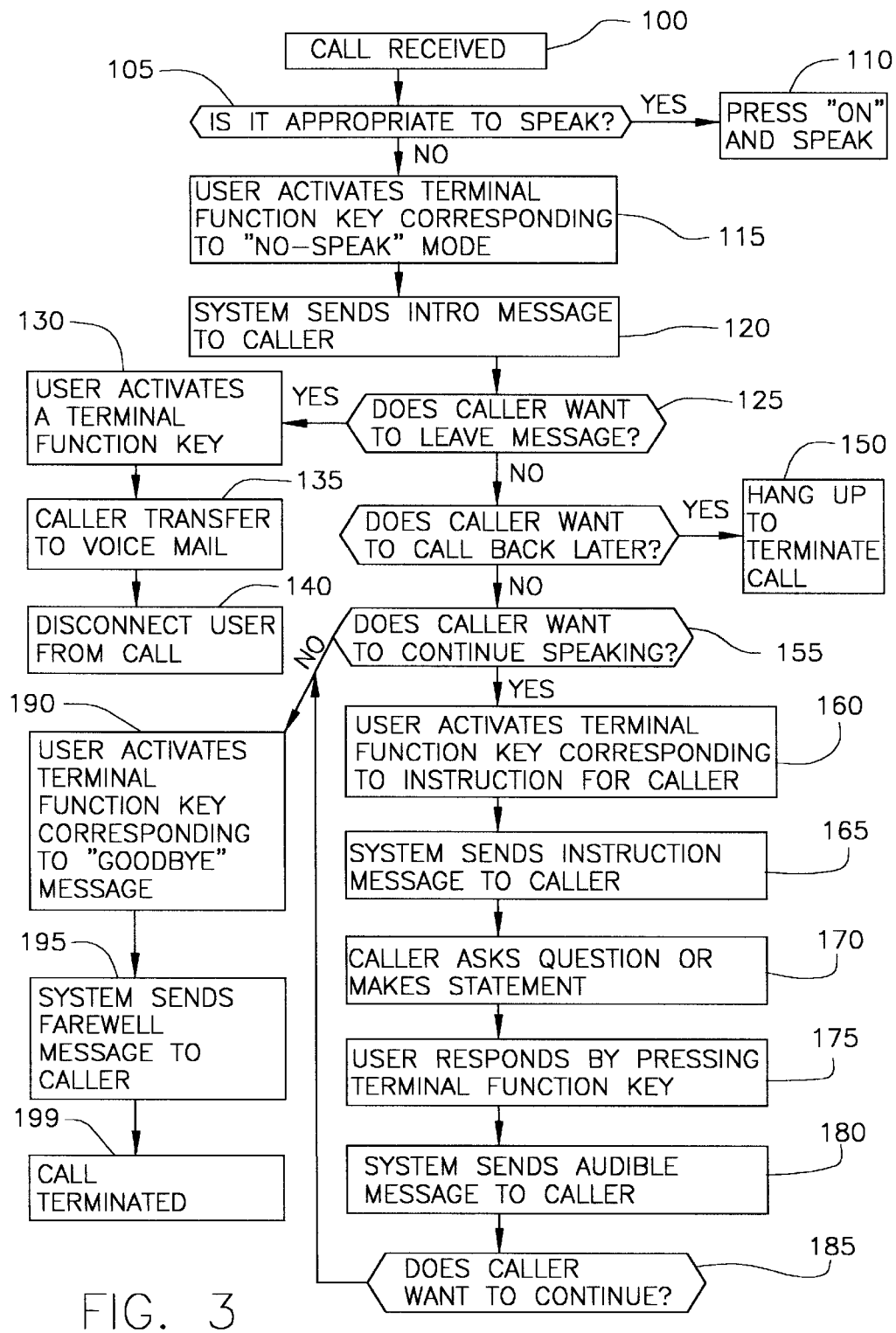
FIG. 3 is a flow chart which illustrates the steps performed by the method of the present invention, in accordance with one embodiment.

FIG. 3 is a flowchart that illustrates the steps performed by the method of the present invention, according to one embodiment. At step 100, a call is received at a wireless terminal such as a cellular telephone. The received call may cause the telephone to ring. However, in a preferred embodiment, the user anticipates that she will be in a location in which it is inappropriate to speak aloud. In this case, the user has already set the wireless terminal to inaudibly signal to the user that a call is incoming, such as by vibrating or flashing a light on the terminal.

At step 105, the user determines whether it is appropriate to speak aloud. If the user determines that it is appropriate to speak aloud, then the method proceeds to step 110, where the user presses the terminal function key that connects the incoming call and begins speaking to the caller. If the user determines that it is not appropriate to speak aloud, then the method proceeds to step 115, where the user presses the terminal function key that activates the "no-speak" mode of operation. Thus, even if the user anticipated that she would be in a location that it was inappropriate to speak aloud, the user may opt to speak in step 110 if the user's situation has changed at the time the call is received. For instance, if a user turns her cellular phone to vibrate mode when she enters a concert hall but receives a call during intermission, the user still has the option to answer the call in the typical fashion since it is appropriate to speak to the caller at this time.

Returning to the flowchart, after step 115, the method proceeds to step 120. At step 120, the system transmits a message to the caller so as to advise the caller that the user has picked up the call but is unable to speak aloud. Preferably, the message also instructs the caller to choose, such as by stating into the telephone a preference, one of several options. These may comprise, according to one embodiment, an option to leave a message, call back later or continue speaking to the user. Therefore, one example of a message which is transmitted to the caller states "I have picked up your call but am unable to speak aloud at this time. Please state whether you would like to leave a message, call back later or continue speaking".

The method proceeds to step 125, where the system determines if the caller wants to leave a message. If the caller's stated preference is to leave a message, then the system proceeds to step 130. At step 130, the user, upon hearing the caller state her preference to leave a message, activates a corresponding terminal function key, such as a predetermined button on the cellular telephone. When the terminal function key is activated, the system proceeds to step 135, where the caller is transferred into the user's voice mail. The user's voice mail is preferably a memory storage location capable of storing a voice message and accessible to the user at a later time. At step 140, the system terminates the call.

If, at step 125, the caller's stated preference is not to leave a message, then the system proceeds to step 145. At step 145, the system determines if the caller wants to call back later. If the caller's stated preference is to call back later, then the system proceeds to step 150, where the user hangs up the phone, thereby terminating the call.

If, at step 145, the caller's stated preference is not to call back later, then the system proceeds to step 155, where the system determines if the caller wants to continue speaking. If the caller's stated preference is not to continue speaking, then the system proceeds to step 190. At step 190, the user activates a terminal function key that corresponds to a farewell message. At step 195, the system transmits the farewell message to the caller. According to one embodiment, the farewell message may comprise a standardized system message such as "Goodbye" or "Thank you for calling". In another embodiment, the farewell message may comprise a personalized farewell message that has been pre-recorded by the user. At step 199, the call is terminated by the system.

If, at step 155, the caller's stated preference is to continue speaking, then the system proceeds to step 160. At step 160, the user activates a terminal function key that corresponds to an instruction to the caller. At step 165, the system transmits to the caller the instruction message. This message, according to one embodiment, comprises an instruction to "Please continue speaking". In a preferred embodiment, the message comprises an instruction to "Please ask yes or no questions only".

At step 170, the caller follows the instruction provided in step 165. Preferably, the caller asks a "yes or no" question of the user, or else merely continues speaking. At step 175, the user responds to the caller's question or statement by activating a terminal function key corresponding to the appropriate response. At step 180, the system delivers an audible response to the caller corresponding to the terminal function key activated in step 175. For instance, at step 175, the user may activate a terminal function key that corresponds to "yes" if that is the appropriate response to a question asked at step 170, or else the user may activate a terminal function key that corresponds to "no" if that is the appropriate response to the question asked at step 170, and at step 180 the response will be transmitted to the caller. Additionally, the user may activate other terminal function keys that correspond to responses such as "I don't know", "Maybe", or a personalized message that has been pre-recorded by the user.

Preferably, the system also transmits to the caller, at step 180, an instruction message following the initial response. For instance, after the system transmits a message "yes" or "no" to the caller, the system may also transmit a message such as "Please continue" or "Ask another question". This way, the caller is prompted to continue the call or to state that no further questions are desired to be asked, and does not mistakenly assume that an additional response from the user is forthcoming.

Next, the method proceeds to step 185, where it is determined whether the caller wishes to continue speaking. If the caller does wish to continue speaking or to ask further questions, then the method returns to step 170 so as to continue the call. If the caller does not wish to continue speaking, then the system proceeds to step 190, whereby the user activates a terminal function key corresponding to the farewell message so as to transmit the farewell message to the caller and terminate the call.

Figure 4:
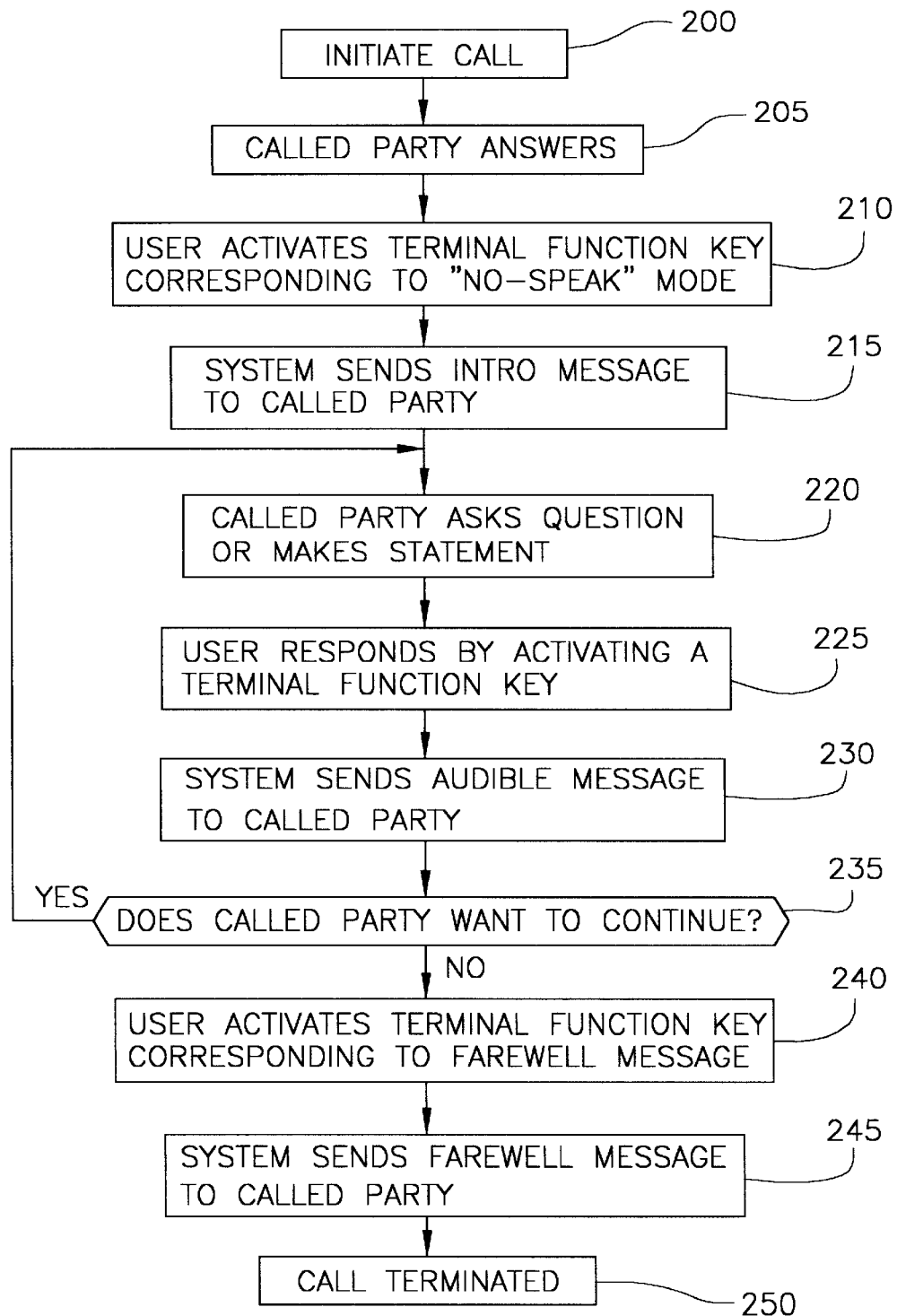
FIG. 4 is a flow chart which illustrates additional steps performed by the method of the present invention, in accordance with one embodiment.

Of course, the flowchart in FIG. 3 illustrates the steps performed by one embodiment of the method wherein the user of the wireless terminal receives a call at a time when it is inappropriate to speak aloud. FIG. 4 is a flowchart that illustrates the steps performed by the method of the present invention, according to one embodiment in which the user of a wireless terminal initiates a call at a time when it is inappropriate for the user to speak aloud. This may be desirable when, for instance, the user has promised to make a telephone call at a certain time, but is in a location where it is inappropriate to speak aloud at the appointed time.

At step 200 of FIG. 4, a call is initiated by the user of a wireless terminal such as a cellular telephone. At step 205, the called party answers the telephone call. At step 210, the user presses a terminal function key that corresponds to an introduction message. At step 215, the system transmits an introduction message to the called party so as to advise the called party that the user making the phone call can hear the called party speak but is unable to speak aloud herself. Preferably, the message also instructs the called party to proceed by asking questions or making statements. Thus, one example of a message which may be transmitted to the called party states "Hello. This is Mr. Smith calling. Although I can hear your voice, I am unable to speak aloud at this time. Please speak now, such as by asking a yes or no question, and I will respond electronically".

This introduction message may be either a standardized system greeting or a personalized message pre-recorded by the user. In the above-stated scenario, wherein the user has promised to make a telephone call at a certain time but is in a location where it is inappropriate to speak aloud at the appointed time, the introduction message may be pre-recorded by the user to reschedule the time for the call, to provide instructions to the called party, or for any other purpose.

At step 220, the called party speaks to the user. Preferably, the called party asks a "yes or no" question of the user, or else merely makes statements which the called party desires the user to know. At step 225, the user responds to the called party's question or statement by activating a terminal function key corresponding to an appropriate response. At step 230, the system delivers an audible response to the called party corresponding to the terminal function key activated in step 225. For instance, at step 225, the user may activate a terminal function key that corresponds to "yes" if that is the appropriate response to a question asked at step 220, or else the user may activate a terminal function key that corresponds to "no" if that is the appropriate response to the question asked at step 220, and at step 230 the response will be transmitted to the called party. As previously discussed in connection with the flowchart in FIG. 3, the user may instead activate other terminal function keys that correspond to responses such as "I don't know", "Maybe", or a personalized message that has been pre-recorded by the user.

Preferably, the system also transmits to the called party, at step 230, an instruction message following the initial response. For instance, after the system transmits a message "yes" or "no" to the called party, the system may also transmit a message such as "Please continue" or "Ask another question". This way, the called party is prompted to continue the call or to state that no further questions are desired to be asked, and does not mistakenly assume that an additional response from the user is forthcoming.

Next, the method proceeds to step 235, where it is determined whether the called party wishes to continue speaking. If the called party does wish to continue speaking or to ask further questions, then the method returns to step 220 so as to continue the call. If the called party does not wish to continue speaking, then the system proceeds to step 240.

At step 240, the user activates a terminal function key that corresponds to a farewell message. At step 245, the system transmits the farewell message to the called party. According to one embodiment, the farewell message may comprise a standardized system message such as "Goodbye" or "Thank you for calling". In another embodiment, the farewell message may comprise a personalized farewell message that has been pre-recorded by the user. At step 250, the call is terminated by the system.

The means by which the user may activate a terminal function key are many. For example, according to one embodiment of the invention, the user activates a terminal function key by pressing a button 20 on wireless terminal 10 corresponding to the function desired to be performed. For instance, with respect to step 175 of the flowchart in FIG. 3, the "1" button on terminal 20's keypad may correspond to "yes" while the "2" button may correspond to "no". Still other buttons 20 may correspond to other answers. This embodiment is particularly suited for terminals that do not have a display screen 14.

In another example, a terminal function key may be activated by employing pointer adjustment means 18 to point to a desired menu item on display screen 14 and pressing selection means 19. Thus, in the embodiment shown in FIG. 2, to activate a terminal function key corresponding to the verbal message "no", a user employs pointer adjustment means to adjust pointer 16 until it points to the second menu item, and then presses selection means 19. Other menu items, such as a personalized message recorded by the user (see menu item 4—"Sell Stock A") are activated in a similar way.

The present invention also contemplates the employment of various system configurations to perform the steps previously discussed. For instance, according to one embodiment of the invention, the steps are performed by a processing chip integral to the wireless terminal. In this embodiment, wireless terminal 20 comprises a processing chip, which has memory locations configured to store standard system messages and personalized messages pre-recorded by a user. Preferably, the processing chip is also configured to perform the steps as illustrated in the flowcharts of FIGS. 2 and 3, such as by causing to be transmitted an audible message corresponding to the terminal function key activated by the user.

In still another embodiment, the activation of a terminal function key by the user, such as by pressing a button 20 or selection means 19, causes a signal to be transmitted from the wireless terminal to a base station servicing the wireless terminal. In this case, the base station comprises the processing means for performing the steps described above. For instance, the base station has memory locations configured to store standard system messages and personalized messages pre-recorded by a user, which are accessed upon the receipt of signals from wireless terminal 20 instructing it to transmit to the other party the corresponding audible messages.

In still another embodiment of the invention, wireless terminal 10 is configured to cooperate with earphone 28 and microphone 30. Earphone 28 and microphone 30 have wire 26 which terminate in male plug 24 and engages receptacle 22 of terminal 10. A user employs earphone 28 so as to hear the other party as well as to hear the audible messages that are transmitted to the other party. One of the additional advantages provided by the use of earphone 28 is that the wireless terminal user does not have to continuously move the terminal when using it as described above. For instance, when a wireless terminal like the one shown in FIG. 2 is employed, a user would typically be required to hold the terminal to her ear while listening to the other party's questions or statements, but would need to remove the terminal from her ear in order to see which button to press or which menu item to select in order to send an appropriate response thereto. By using earphone 28, the wireless terminal user may continuously hold the terminal in front of her so as to see which button to press or which menu item to select when sending an appropriate response.

According to other embodiments of the invention, wireless terminal 10 is configured so as to eliminate the need for earphone 28 while still providing the advantage that a wireless terminal user does not have to continuously move the terminal when using it as described above. For instance, in one embodiment, the configuration of the wireless terminal limits the number of responses that the user may make during the call to only two, such as "yes" and "no", and assigns to each of these two responses a terminal function key that the user can select without needing to remove the terminal from her ear to look which terminal function key to press. For instance, in a first such embodiment, the terminal is configured such that the "3" button corresponds to a "yes" response while the "6" button corresponds to a "no" response. In this case, when a user is holding the wireless terminal in her left hand, she can position two fingers on the "3" and "6" buttons and press them without removing the phone from her ear or re-adjusting her grip on the phone.

In another such embodiment, such as a wireless terminal as shown in FIG. 2, pointer adjustment means 18 may be employed to move pointer 16 between a first terminal function key position corresponding to "yes" and a second terminal function key position corresponding to "no". In this case, a user can roll pointer adjustment means 18 up and press selection means 19 in order to send a "yes" response, or can roll pointer adjustment means 18 down and press selection means 19 in order to send a "no" response, without removing the terminal from her ear. While either of these embodiments may be employed with a wireless terminal which is configured to provide more than two responses, the likelihood of the user activating the wrong terminal function key and sending an unintended response is increased when more than two response options are provided.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

We claim:

1. A method for communicating via a wireless terminal, said method comprising the steps of:
    establishing a wireless communication link between a wireless terminal user and a second party, such that said user is enabled to listen to speech uttered by said second party;
    selectively activating at said wireless terminal the transmission of at least one audible message for receipt by said second party, wherein said at least one audible message is responsive to said speech uttered by said second party.

2. The method according to claim 1, wherein said at least one audible message is selected by said wireless terminal user from a plurality of audible messages.

3. The method according to claim 2, wherein at least one of said plurality of audible messages is a personalized message pre-recorded by said wireless terminal user.

4. The method according to claim 1, wherein said wireless communication link is initiated by said second party.

5. The method according to claim 1, wherein said wireless communication link is initiated by said wireless terminal user.

6. The method according to claim 1, wherein said activating step further comprises activating a terminal function key corresponding to said at least one audible message.

7. The method according to claim 6, wherein said step of activating a terminal function key comprises pressing a key on a keypad of said wireless terminal.

8. The method according to claim 7, wherein said step of activating a terminal function key comprises pressing one of two said keys on said keypad, said two keys positioned on said wireless terminal so as to be pressed by said wireless terminal user without removing said terminal from said user's ear.

9. The method according to claim 6, wherein said step of activating a terminal function key comprises selecting a menu item from a display screen of said wireless terminal.

10. The method according to claim 9, wherein said step of activating a terminal function key comprises selecting one of two said menu items on said display screen, said two menu items positioned on said wireless terminal so as to be selected by said wireless terminal user without removing said terminal from said user's ear.

11. A communication system comprising:

a wireless terminal configured to establish a wireless communication link between a wireless terminal user and a second party, such that said user is enabled to listen to speech uttered by said second party; said wireless terminal further configured, upon selective activation by said wireless terminal user, to transmit at least one audible message for receipt by said second party, wherein said at least one audible message is responsive to speech uttered by said second party.

12. The system according to claim 11, wherein said wireless terminal is further configured such that said at least one audible message is selectable by said wireless terminal user from a plurality of audible messages.

13. The system according to claim 12, wherein at least one of said plurality of audible messages is a personalized message pre-recorded by said wireless terminal user.

14. The system according to claim 11, wherein said wireless communication link is initiated by said second party.

15. The system according to claim 11, wherein said wireless communication link is initiated by said wireless terminal user.

16. The system according to claim 1, wherein said wireless terminal further comprises a terminal function key corresponding to said at least one audible message.

17. The system according to claim 16, wherein said terminal function key comprises a key on a keypad of said wireless terminal.

18. The system according to claim 17, wherein said wireless terminal has two terminal function keys comprising two said keys on said keypad, said two keys positioned on said wireless terminal so as to be pressed by said wireless terminal user without removing said terminal from said user's ear.

19. The system according to claim 16, wherein said terminal function key comprises a menu item on a display screen of said wireless terminal.

20. The system according to claim 19, wherein said wireless terminal has two terminal function keys comprising two said menu items on said display screen, said two menu items positioned on said wireless terminal so as to be selected by said wireless terminal user without removing said terminal from said user's ear.

21. The system according to claim 11, further comprising an earphone configured to be worn by said wireless terminal user, such that said wireless terminal user can hear said messages without placing said terminal in the vicinity of said user's ear.

22. The system according to claim 11, wherein said at least one audible message is stored in a memory location integral to said wireless terminal.

23. The system according to claim 11, wherein said at least one audible message is stored in a memory location at a base station configured to service said wireless terminal, said audible message transmitted to said second party in response to a corresponding signal transmitted by said wireless terminal.

24. The system according to claim 11, wherein said wireless terminal is a cellular phone.

25. A method for communicating via a wireless terminal, said method comprising the steps of:

establishing a wireless communication link between a wireless terminal user and a second party, such that said user is enabled to listen to speech uttered by said second party;

selectively activating at said wireless terminal the transmission of at least one of a plurality of audible messages for receipt by said second party, wherein said at least one audible message is responsive to speech uttered by said second party.

26. The method according to claim 25, wherein one of said plurality of audible messages for receipt by said second party is a request to said second party to phrase questions that lead to affirmative and negative answers by said user.

27. The method according to claim 25, wherein one of said plurality of audible messages for receipt by said second party is an affirmative answer.

28. The method according to claim 25, wherein one of said plurality of audible messages for receipt by said second party is a negative answer.

29. The method according to claim 25, wherein one of said plurality of audible messages for receipt by said second party is "I am not sure."

30. The method according to claim 25, wherein one of said plurality of audible messages for receipt by said second party is "maybe."

* * * * *